US009595864B2

(12) United States Patent
Heikkilä

(10) Patent No.: US 9,595,864 B2
(45) Date of Patent: Mar. 14, 2017

(54) METHOD AND APPARATUS FOR BALANCING VOLTAGES OF MULTI-LEVEL INVERTER DC LINK

(71) Applicant: ABB Oy, Helsinki (FI)

(72) Inventor: Samuli Heikkilä, Helsinki (FI)

(73) Assignee: ABB Technology Oy, Helsinki (FI)

( * ) Notice: Subject to any disclaimer, the term of this patent is extended or adjusted under 35 U.S.C. 154(b) by 141 days.

(21) Appl. No.: 14/478,140

(22) Filed: Sep. 5, 2014

(65) Prior Publication Data

US 2015/0070947 A1 Mar. 12, 2015

(30) Foreign Application Priority Data

Sep. 11, 2013 (EP) ..................................... 13183897

(51) Int. Cl.
*H02M 7/487* (2007.01)
*H02M 1/44* (2007.01)

(52) U.S. Cl.
CPC ............. *H02M 1/44* (2013.01); *H02M 7/487* (2013.01)

(58) Field of Classification Search
CPC ................................ H02M 1/44; H02M 7/487
USPC ...................................................... 363/36–43
See application file for complete search history.

(56) References Cited

U.S. PATENT DOCUMENTS

| 5,321,599 | A  | * | 6/1994 | Tanamachi | ............ | H02M 7/487 |
|---|---|---|---|---|---|---|
| | | | | | | 318/811 |
| 7,573,732 | B2 | * | 8/2009 | Teichmann | ............. | H02M 1/32 |
| | | | | | | 363/37 |
| 8,441,820 | B2 | * | 5/2013 | Shen | ...................... | H02M 7/487 |
| | | | | | | 363/131 |
| 8,736,111 | B2 | * | 5/2014 | Song | ........................ | H02J 3/383 |
| | | | | | | 307/125 |
| 9,030,852 | B2 | * | 5/2015 | Wijekoon | .............. | H02M 5/297 |
| | | | | | | 363/131 |
| 9,030,854 | B2 | * | 5/2015 | Escobar | ................... | H02M 7/42 |
| | | | | | | 363/40 |
| 9,071,164 | B2 | * | 6/2015 | Schroeder | ............. | H02M 7/487 |

(Continued)

FOREIGN PATENT DOCUMENTS

| EP | 2 597 768 A2 | 5/2013 |
| EP | 2 613 432 A1 | 7/2013 |

OTHER PUBLICATIONS

European Search Report dated Feb. 10, 2014.

*Primary Examiner* — Timothy J Dole
*Assistant Examiner* — Htet Z Kyaw
(74) *Attorney, Agent, or Firm* — Taft Stettinius & Hollister LLP

(57) ABSTRACT

A method is provided for balancing voltages of a DC link of a multi-level inverter, where the DC link is divided into two halves by a neutral point connection. The method includes injecting a periodic common-mode voltage injection signal to a common-mode voltage reference and a periodic power injection signal to a power reference of the inverter. The power injection signal has the same frequency as the common-mode voltage injection signal. A phase shift between the common-mode voltage injection signal and the power injection signal is constant. The amplitude of at least one of the common-mode voltage injection signal and the power injection signal is controlled on the basis of a difference between voltages over the two halves of the DC link. An apparatus is also provided for implementing the method.

18 Claims, 2 Drawing Sheets

(56) References Cited

U.S. PATENT DOCUMENTS

| | | | |
|---|---|---|---|
| 9,083,261 B2* | 7/2015 | Yang | H02M 7/487 |
| 9,274,159 B2* | 3/2016 | Wang | B60L 3/0069 |
| 2011/0141786 A1 | 6/2011 | Shen et al. | |
| 2012/0281442 A1* | 11/2012 | Revelant | H02M 7/487 |
| | | | 363/40 |
| 2013/0128632 A1 | 5/2013 | Yang et al. | |
| 2013/0176757 A1 | 7/2013 | Morati et al. | |
| 2014/0140112 A1* | 5/2014 | Zhou | H02M 1/126 |
| | | | 363/40 |
| 2016/0149507 A1* | 5/2016 | Lei | H02M 1/12 |
| | | | 363/35 |

* cited by examiner

METHOD AND APPARATUS FOR BALANCING VOLTAGES OF MULTI-LEVEL INVERTER DC LINK

RELATED APPLICATION

This application claims priority under 35 U.S.C. §119 to European Patent Application No. 13183897.1 filed in Europe on Sep. 11, 2013, the entire content of which is hereby incorporated by reference in its entirety.

FIELD

The present disclosure relates to multi-level, multi-phase inverters, and more particularly to balancing of DC link voltages of such inverters.

BACKGROUND INFORMATION

Compared with two-level inverters, multi-level inverters, such as a three-level inverter, for example, can achieve a better output signal waveform. In a multilevel-level inverter, the DC link may be divided into two halves by a neutral point (NP). Output phases of the inverter may be switched to a positive pole, a negative pole or the neutral point of the DC link. This allows use of smaller voltage steps in output voltage generation. FIG. 1 shows a conceptual diagram of a three-level, three-phase inverter.

In FIG. 1, a DC link 11 includes two capacitors $C_1$ and $C_2$ connected in series. The DC link 11 includes a positive pole DC+, a negative pole DC−, and a neutral point NP. The voltage $u_{DC}$ over the DC link is the sum of voltages $u_{C1}$ and $u_{C2}$ over the capacitors $C_1$ and $C_2$. Each capacitor forms one half of the DC link. The inverter output voltage is generated by connecting each of phase lines 12 of a load 13 to the positive pole DC+, the negative pole DC− or the neutral point NP. The load 13 may be an electric motor or a generator, for example.

FIG. 1 shows a high-side current $i_{hi}$, i.e., a current from the positive pole DC+ to the load 13, and a low-side current $i_{lo}$, i.e., a current from the negative pole DC− to the load 13. $i_{NP}$ represents a current from the neutral point NP to the load 13. The magnitude of neutral point current $i_{NP}$ equals the difference between magnitudes of the high-side current $i_{hi}$ and low-side current $i_{lo}$.

The phase lines 12 are connected to the DC link in FIG. 1 through switching arrangements 14 which may include a plurality of semiconductor switches, such as IGBTs or MOSFETs.

Topologies including a neutral point dividing the DC link into two halves, as in FIG. 1, may involve a modulation strategy which keeps the voltages over the halves in balance. In FIG. 1, this means that the high- and low-side capacitor voltages $u_{C1}$ and $u_{C2}$ are maintained as close as possible to each other in all situations. In this document, balancing of the voltages over the halves of the DC link may also be referred to as neutral point (NP) voltage balancing.

One known NP voltage balancing method utilizes a common-mode (CM) voltage control based on selecting the applied switching patterns.

A three-level inverter, such as that in FIG. 1, may have redundancy in the switching patterns of the switches of the inverter bridge. In this context, the switching pattern refers to a combination of switching states of the switches. The switches, each set to a (conducting or non-conducting) state, produce an output voltage vector.

For example, one desired output voltage vector may be achieved with two switching patterns: a switching pattern coupling the load to the voltage potential of the higher half of the DC link, and another coupling the load to the voltage potential of the lower half of the DC link. By choosing which switching combinations are used, the common mode voltage may be controlled.

In the above voltage balancing method, a CM voltage control reference controlling the common mode voltage is adjusted on the basis of the output power and an NP voltage unbalance, i.e. a difference between $u_{C1}$ and $u_{C2}$. For example, if the NP voltage is too low ($u_{C1} > u_{C2}$ in FIG. 1) and the actual power is positive (i.e. the power is fed from the inverter to a load), the CM voltage reference may be increased to a positive value thereby causing the inverter to modulate in such a way that an average duration of switching patterns connected to the positive DC link pole DC+ exceeds the duration of patterns connected to the negative DC link pole DC−. This difference in durations, in turn, increases the current $i_{hi}$ of the positive pole DC+ and decreases current $i_{lo}$ of the negative pole DC−. The NP current $i_{NP}$ becomes negative, which decreases $u_{C1}$ voltage and balances the NP voltage. Correspondingly, if the NP voltage is too high or the output power is negative, the CM voltage may be decreased to a negative value in order to balance the NP voltage.

If the output power is high enough so that the direction of power flow between the inverter and the load can be detected, the NP voltage can be balanced in a robust manner.

However, if the actual power is low, the NP voltage may become unstable as power estimation errors may cause wrongly detected power flow directions. Also, if the actual power is zero and the NP potential is unbalanced, the method may not be able to stabilize the NP potential as there is no power available for balancing.

SUMMARY

An exemplary embodiment of the present disclosure provides a method for balancing voltages of a DC link of a multi-level inverter, wherein the DC link is divided into two halves by a neutral point connection. The exemplary method includes injecting a periodic common-mode voltage injection signal to a common-mode voltage reference, and injecting a periodic power injection signal to a power reference of the inverter, where the power injection signal has the same frequency as the common-mode voltage injection signal. In addition, the exemplary method includes controlling at least one of (i) an amplitude of at least one of the common-mode voltage injection signal and the power injection signal, and (ii) a phase shift between the common-mode voltage injection signal and the power injection signal on the basis of a difference between voltages over the two halves of the DC link.

An exemplary embodiment of the present disclosure provides an apparatus for balancing voltages of a DC link of a multi-level inverter, wherein the DC link is divided into two halves by a neutral point connection. The exemplary apparatus includes means for injecting a common-mode voltage injection signal to a common-mode voltage reference and a power injection signal to a power reference of the inverter, the power injection signal having the same frequency as the common-mode voltage injection signal. In addition, the exemplary apparatus includes means for controlling at least one of (i) an amplitude of at least one of the common-mode voltage injection signal and the power injection signal, and (ii) a phase shift between the common-mode voltage injection signal and the power injection signal on the basis of a difference between voltages over the two halves of the DC link.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Exemplary embodiments of the present disclosure provide a method and an apparatus for implementing the method so as to alleviate the above disadvantages. Exemplary embodiments of the present disclosure provide a method and apparatus for balancing voltages of a DC link of a multi-level inverter, wherein the DC link is divided into two halves by a neutral point connection.

Voltages over halves of a DC link of a multi-level inverter may be balanced by a method in which a periodic signal is injected to common-mode voltage of the inverter while injecting another periodic signal of the same frequency to a power reference of the inverter. The phase shift between the injected periodic signals is held constant. A periodic signal may be injected to a real component of the power reference or to a reactive component of the power reference.

By injecting the periodic signals, energy can be transferred from one half of the DC link to another half of the DC link through a load connected to the inverter. Transferring energy from one half to another has a direct effect on the voltages over the halves. Direction of the energy transfer may be controlled by controlling the amplitude of one of the periodic signals. Direction of the energy transfer may also be controlled by controlling a phase shift between the periodic signals.

Thus, the method of the present disclosure is able to balance the voltages, even when the power from the inverter to the load is small or zero.

An exemplary embodiment of the present disclosure provides a method for balancing voltages of a DC link of a multi-level inverter, where the DC link is divided into two halves by a neutral point connection. The inverter may be connected to a load, such as an LCL filter, an electric motor or a generator.

From one point of view, the method utilizes oscillating energy between the DC link and a load. Energy may be drawn from one half of the DC link and stored temporarily in the load. The energy may then be transferred to the other half of the DC link. Transferring energy from one half to another changes the voltage balance between the halves.

The method includes injecting a common-mode voltage injection signal to a common-mode voltage reference and a power injection signal to a power reference of the inverter. The power injection signal has the same frequency as the common-mode voltage injection signal. The periodic injection signals may be sinusoidal, for example. The average of the common-mode voltage injection signal may be zero so that an effect of the common-mode voltage injection signal on the common-mode voltage control is minimized. The average of the power injection signal may also be zero so that an effect of the power injection signal on the power control is minimized.

Figure 1:
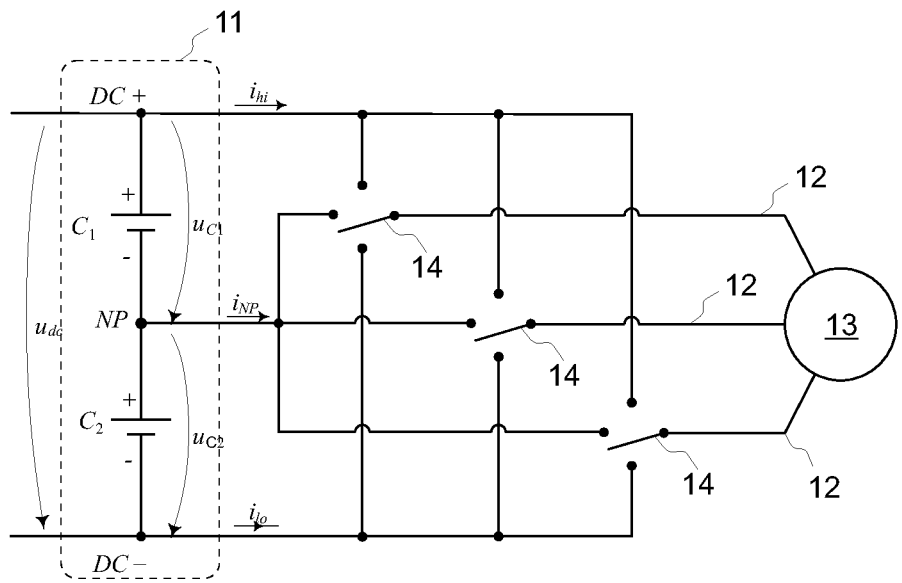
FIG. 1 shows a conceptual diagram of a three-level, three-phase inverter.
Figure 2:
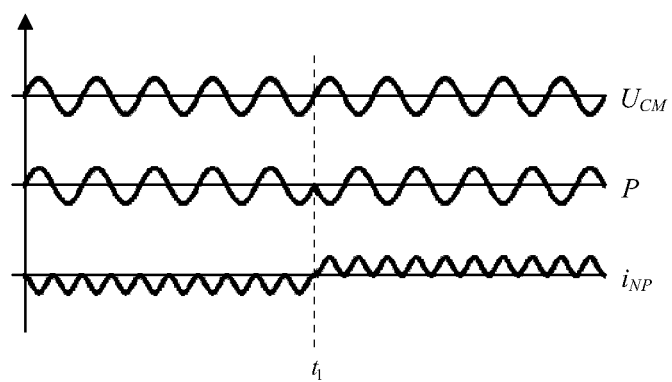
FIG. 2 shows exemplary waveforms of sinusoidal components being injected to the real component P of the power reference and the CM voltage reference $U_{CM}$.

FIG. 2 shows exemplary waveforms of sinusoidal components being injected to the real component P of the power reference and the CM voltage reference $U_{CM}$. The waveforms are applicable to a three-level inverter of FIG. 1, for example. In FIG. 2, the average actual power is zero and the injected signals are in phase.

Before time instant $t_1$ in FIG. 2, the average actual power is zero. During the positive half periods of the injected components, switching patterns fulfilling the power reference P and the CM voltage reference $U_{CM}$ drive the high-side current $i_{hi}$ positive (in a direction indicated in FIG. 1) and the low-side current $i_{lo}$ negative (in a direction indicated in FIG. 1). The magnitude of the high-side current $i_{hi}$ is greater than the magnitude of the low-side current $i_{lo}$ so that the neutral point current $i_{NP}$ becomes negative (in a direction indicated in FIG. 1). Correspondingly, during the negative half periods, the high-side current $i_{hi}$ is negative and the low-side current $i_{lo}$ is positive. The magnitude of the high-side current $i_{hi}$ is smaller than the magnitude of the low-side current $i_{lo}$ so the neutral point current $i_{NP}$ remains negative. Thus, the neutral point current $i_{NP}$ remains below zero. The neutral point current $i_{NP}$ oscillates at double frequency compared with the frequency of the injected signals and follows with the peak values of the injected signals.

After time instant $t_1$ in FIG. 2, the polarity of the amplitude of the injected power signal in the power reference P is reversed. In this context, the term "amplitude" indicates a magnitude or peak-to-peak value of a signal together with a polarity of the signal. Thus, amplitude can also have negative values. For example, a signal $-A\sin(x)$ with negative amplitude $-A$ has the same peak-to-peak value as a signal $A\sin(x)$ with amplitude A but has an opposite polarity. The average of the injected power is still zero. Following the same reasoning as in the case of the in-phase injected signals, the neutral point current $i_{NP}$ is now always positive and oscillates at a double frequency of the injected signals.

In order to achieve a balance between the two halves of the DC link, an amplitude of at least one of the common-mode voltage injection signal and the power injection signal may be controlled responsive to a difference between voltages over the two halves. A phase shift between the common-mode voltage injection signal and the power injection signal may be constant. Switching patterns fulfilling the common-mode voltage injection and power injection signals in the references produce an energy flow from one half of the DC link to another. For example, in FIG. 2, if the high-side voltage $u_{C1}$ is greater than the low-side voltage $u_{C2}$, energy may be taken from the high-side half (i.e. $C_1$) of the DC link during a positive half period of the common mode reference $U_{CM}$ and stored temporarily in the load until the successive negative half period carries the energy back to the low-side half (i.e. $C_2$). Correspondingly, if the high-side voltage $u_{C1}$ is smaller than the low-side voltage $u_{C2}$, energy may be carried from the low side to the high side by using the load as a temporary energy storage.

Although the average of the real power is zero in FIG. 2, the method of the present disclosure is not limited to using zero average power. The power reference and/or the signal injected to the power reference may be non-zero.

A multi-level inverter, such as that shown in FIG. 1, may be controlled by an exemplary embodiment of the method that balances the neutral point voltage by injecting the power injection signal to the real component of the power reference. The CM voltage injection amplitude is kept constant and the amplitude of an injected real power component is adjusted proportional to NP unbalance $u_{C1}-u_{C2}$. The phase shift between the common-mode voltage injection signal and the power injection signal is zero.

The following equations may be formed for an injected periodic common mode signal $\tilde{U}_{CM}$ and an injected periodic power signal $\tilde{P}$ as functions of time t:

$$\tilde{U}_{CM}=k_{CM}\sin(\omega_c t),$$

$$\tilde{P}=k_P(u_{C1}-u_{C2})\sin(\omega_c t), \quad (1)$$

where $k_{CM}$ and $k_P$ are positive coefficients and $\omega_c$ is the injection frequency. The injected power $\tilde{P}$ is in phase with the injected CM voltage $\tilde{U}_{CM}$.

The injected periodic power signal $\tilde{P}$ in Equation 1 forms a P (proportional) controller driving the NP unbalance to zero. If the NP voltage is too low, i.e. $u_{C1}>u_{C2}$, an amplitude coefficient $k_P(u_{C1}-u_{C2})$ of the injected power $\tilde{P}$ is positive. Thus, the neutral point current $i_{NP}$ is negative. The negative neutral point current $i_{NP}$ discharges the capacitor $C_1$ of the DC link 11 and charges the capacitor $C_2$ of the DC link 11 thereby balancing the NP voltage.

If the NP potential is too high, the amplitude coefficient becomes negative. In other words, the injected power $\tilde{P}$ has its negative peak value when the injected CM voltage $\tilde{U}_{CM}$ has its positive peak value. As a result, the neutral point current $i_{NP}$ is positive and balances the NP voltage.

According to Equation 1, no power is injected as long as the NP voltage is balanced. However, if the NP voltage is unbalanced, the amplitude of the injection is non-zero. The injected periodic signal induces a ripple to the power reference which may in some cases cause harmful torque oscillation, for example in a motor or a generator.

To avoid the torque oscillation, it is possible to balance the NP voltage by using magnetic energy or electric potential energy of a load (e.g., load 13 in FIG. 1) as a temporary energy storage. This can be accomplished by adding a periodic component to a reference value affecting the reactive power fed to the load. The power injection signal may be injected to the reactive component of the power reference, for example.

In case of inductive loads, such as induction motors, the injection of the power injection signal to the reactive component of the power reference may be performed by adding an injection signal to a flux or magnetizing current reference. When the flux increases, magnetic energy of the motor increases. The power required for the increased magnetic energy is drawn from the DC link. Correspondingly, when the flux decreases, magnetic energy is converted to electrical energy and may be carried back to the DC link. The oscillating reactive power at the injection frequency may be used for carrying energy between the low-side and high-side DC link capacitors and, thus, for stabilizing the NP voltage in the same manner as with the real power injection. However, now the injection signal (magnetizing current) does not affect the motor torque.

In a similar manner, in case of capacitive loads, such as LCL filters, the reactive power injection causes an oscillating energy between the filter capacitors and the DC link and, therefore, may also be used for NP voltage balancing.

Thus, in the case of an inductive load or a capacitive load, oscillating power flows from the DC link to the load when increasing the reactive power of an inductive load or a capacitive load. The power flows back to the DC link when decreasing the reactive power. The oscillating power used for NP voltage balancing has a leading phase compared with the injected reactive power.

Therefore, the injected reactive power may be formulated to have a lagging phase shift $\alpha$ $(=0 \ldots \pi/2)$ compared with the injected CM voltage. The following NP voltage balancing equations may be formed for an injected periodic common mode signal $\tilde{U}_{CM}$ and an injected periodic reactive power signal $\tilde{Q}$ as functions of time t:

$$\tilde{U}_{CM}=k_{CM}\sin(\omega_c t),$$

$$\tilde{Q}=k_P(u_{C1}-u_{C2})\sin(\omega_c t-\alpha). \quad (2)$$

In Equation 2, the common-mode voltage injection signal has a leading phase to the power injection signal.

In the above examples, the NP voltage balancing is achieved by controlling the amplitude of one of the injected signals while the phase shift is held constant. Alternatively, the NP voltage may be balanced by controlling a phase shift between the common-mode voltage injection signal and the power injection signal responsive to a difference between the voltages over the two halves of the DC link.

Figure 3:
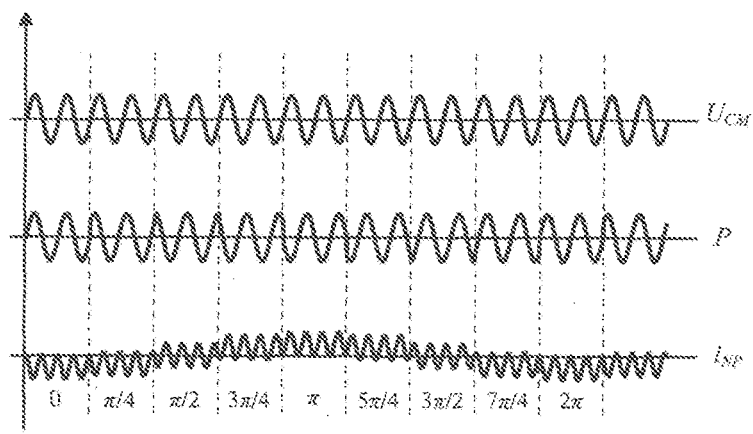
FIG. 3 shows exemplary waveforms of a situation where a phase shift between the injected signals is changed in steps.
Figure 4:
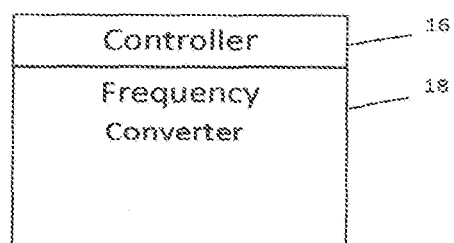
FIG. 4 shows a controller and a frequency converter.

FIG. 3 shows exemplary waveforms of a situation where a phase shift between the injected signals is changed in $\pi/4$ (45 degree) steps. The amplitudes of the injected signal are held constant. In FIG. 3, the phase of the real power reference P is altered with respect to the CM voltage reference $U_{CM}$. Throughout the phase shift steps, the neutral point current $i_{NP}$ retains its alternating shape but its offset with respect the zero current level (x axis) changes in response to the phase shift. As a result, the average of the neutral point current $i_{NP}$ changes in response to the phase shift. A phase shift (e.g. at angle $\alpha$) and the same phase shift in the other direction ($-\alpha$) result in the same average currents.

At phase shift points $\pi/2$ and $3\pi/2$ (i.e. $-\pi/2$), the average of the neutral point current $i_{NP}$ is zero. When moving away from these points, the average of the neutral point current $i_{NP}$ increases or decreases monotonically, depending on the direction. For example, at phase shift points $\pi/2$ in FIG. 3, the average of the neutral point current $i_{NP}$ becomes more positive if the phase shift is increased. However, beyond a distance of $\pi/2$ from these point, i.e. $\pi/2+\pi/2=\pi$, the rate of change of the average of the neutral point current $i_{NP}$ changes its direction. In order to avoid control problems caused by non-monotonic rate of change, the operating range of the phase shift may be limited to a range of $-\pi/2$ to $\pi/2$ from a base phase shift.

When controlling a phase shift between the common-mode voltage injection signal and the power injection signal responsive to the difference between the voltages over the two halves of the DC link, the phase shift may include a constant base portion and an adjustable portion which is controlled on the basis of the difference between the voltages over the two halves, wherein the adjustable portion can be controlled in the range of $-\pi/2$ to $\pi/2$.

For example, a power injection signal may be injected to the real power component P of a power reference and the constant base portion may be $-\pi/2$ or $\pi/2$. The following equations may be formed for the injected common mode voltage signal $\tilde{U}_{CM}$ and the injected real power signal $\tilde{P}$:

$$\tilde{U}_{CM}=k_{CM}\sin(\omega_c t),$$

$$\tilde{P}=k_P\sin(\omega_c t\pm(\pi/2-k_\theta(u_{C1}-u_{C2}))), \quad (3)$$

where $k_{CM}$, $k_P$ ja $k_\theta$ are positive coefficients and an adjustable portion $k_\theta(u_{C1}-u_{C2})$ is controlled in the range $\pi/2 \geq k_\theta(u_{C1}-u_{C2}) \geq \pi/2$.

In a similar manner, the balancing can also be accomplished by controlling the phase shift of a signal injected to reactive power, such as the reactive component of the power reference in FIG. 1. A power injection signal may be injected to the real power component Q of a power reference. The constant base portion may also include a lagging phase shift α (=0 . . . π/2), i.e. the constant base portion becomes −α±π/2. For example, following equations may be formed for the injected common mode voltage signal $\tilde{U}_{CM}$ and the injected reactive power signal $\tilde{Q}$:

$$\tilde{U}_{CM} = k_{CM} \sin(\omega_c t),$$

$$\tilde{Q} = k_P \sin(\omega_c t - \alpha \pm (\pi/2 - k_\theta(u_{C1} - u_{C2}))). \quad (4)$$

The present disclosure also discloses an apparatus implementing the method. The apparatus may be configured to balance voltages of a DC link of a multi-level inverter, such a as a three-level, three-phase inverter. In the inverter, the DC link is divided into two halves by a neutral point connection.

The apparatus includes means 16 configured to inject a common-mode voltage injection signal to a common-mode voltage reference and a power injection signal to a power reference of the inverter. These means may be part of a controller 16 of a frequency converter 18, for example. The controller 16 may be a CPU, a DSP or an FPGA, for example. Alternatively, the means configured to inject the injection signals may be implemented on a separate apparatus. The power injection signal may have the same frequency as the common-mode voltage injection signal and a phase shift between the common-mode voltage injection signal and the power injection signal may be a constant.

The means 16 may be configured to control an amplitude of at least one of the common-mode voltage injection signal and the power injection signal on the basis of a difference between voltages over the two halves of the DC link.

For example, a frequency converter 18 including a multi-level inverter bridge may also include an apparatus including the means 16 for injecting the injection signals to the references. The frequency converter operates the switches in the inverter bridge in a manner that fulfils the common-mode voltage reference and the power reference. The common-mode voltage injection signal and the power injection signal injected present in the references drive an unbalance between the voltages over the DC link halves to a minimum.

The means 16 included in the apparatus may also be configured to control a phase shift between the common-mode voltage injection signal and the power injection signal on the basis of a difference between voltages over the two halves of the DC link. The means of the apparatus of the present disclosure can include analog and/or digital circuitry (e.g., switches, capacitors, etc.) for carrying out the operative functions of the means of the apparatus for implementing the method as described herein.

Although the above embodiments have discussed a sinusoidal injection signals, the injected signals need not be sinusoidal.

Further, the injection frequency can be chosen arbitrarily. However, lower frequencies carry less power (for NP balancing) than higher frequencies.

The frequency of the common-mode voltage injection signal and the power injection signal may be the frequency of the third harmonic of the fundamental frequency of the inverter output signal. The use of the third harmonic may be preferable in some embodiments, since the common-mode voltage may include a third harmonic component anyway in order to achieve a maximum output voltage.

It is also possible to alter the amplitude of the injected common-mode voltage signal instead of the amplitude of the injected power signal. Further, amplitudes of both injected signals may be adjusted simultaneously. Also, it is possible to balance the NP voltage by controlling an amplitude or both amplitudes of the injected signals while also controlling the phase shift between the signals.

It is obvious to a person skilled in the art that the inventive concept can be implemented in various ways. The disclosure and its embodiments are not limited to the examples described above but may vary within the scope of the claims.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A method for balancing voltages of a DC link of a multi-level inverter, wherein the DC link is divided into two halves by a neutral point connection, the method comprising:
    injecting a periodic common-mode voltage injection signal to a common-mode voltage reference;
    injecting a periodic power injection signal to a power reference of the inverter, the power injection signal having the same frequency as the common-mode voltage injection signal; and
    controlling at least one of (i) an amplitude of at least one of the common-mode voltage injection signal and the power injection signal, and (ii) a phase shift between the common-mode voltage injection signal and the power injection signal on the basis of a difference between voltages over the two halves of the DC link.

2. A method as claimed in claim 1, wherein the phase shift between the common-mode voltage injection signal and the power injection signal is zero, and the power injection signal is injected to a real component of the power reference.

3. A method as claimed in claim 2, wherein an average of the power injection signal is zero.

4. A method as claimed in claim 2, wherein an average of the common mode voltage injection signal is zero.

5. A method as claimed in claim 1, wherein the power injection signal is injected to a reactive component of the power reference.

6. A method as claimed in claim 5, wherein the injecting of the power injection signal to the reactive component of the power reference comprises adding an injection signal to one of a flux reference and a magnetising current reference.

7. A method as claimed in claim 6, wherein the common-mode voltage injection signal has leading phase to the power injection signal.

8. A method as claimed in claim 5, wherein the common-mode voltage injection signal has leading phase to the power injection signal.

9. A method as claimed in claim 5, wherein an average of the power injection signal is zero.

10. A method as claimed in claim 5, wherein an average of the common mode voltage injection signal is zero.

11. A method as claimed in claim 1, wherein the phase shift comprises a constant base portion and an adjustable portion which is controlled on the basis of the difference between the voltages over the two halves, wherein the adjustable portion is controllable in the range of $-\pi/2$ to $\pi/2$.

12. A method as claimed in claim 11, wherein the power injection signal is injected to the real component of a power reference and the constant base portion is $-\pi/2$ or $\pi/2$.

13. A method as claimed in claim 11, wherein the power injection signal is injected to the reactive component of a power reference, and the constant base portion is the sum of a term $-\pi/2$ or $\pi/2$ and a lagging phase shift portion $\alpha$.

14. A method as claimed in claim 1, wherein the frequency of the common-mode voltage injection signal and the power injection signal is a frequency of the third harmonic of a fundamental frequency of an output signal of the inverter output.

15. A method as claimed in claim 1, wherein an average of the power injection signal is zero.

16. A method as claimed in claim 1, wherein an average of the common mode voltage injection signal is zero.

17. An apparatus for balancing voltages of a DC link of a multi-level inverter, wherein the DC link is divided into two halves by a neutral point connection, the apparatus comprising:

means for injecting a common-mode voltage injection signal to a common-mode voltage reference and a power injection signal to a power reference of the inverter, the power injection signal having the same frequency as the common-mode voltage injection signal; and means for controlling at least one of (i) an amplitude of at least one of the common-mode voltage injection signal and the power injection signal, and (ii) a phase shift between the common-mode voltage injection signal and the power injection signal on the basis of a difference between voltages over the two halves of the DC link.

18. A three-phase, three-level inverter comprising the apparatus as claimed in claim 17.

* * * * *